Jan. 14, 1936.　　　R. D. PARKS ET AL　　　2,027,698
AUTOMATIC CORN POPPING MACHINE
Filed May 22, 1933　　　7 Sheets-Sheet 1
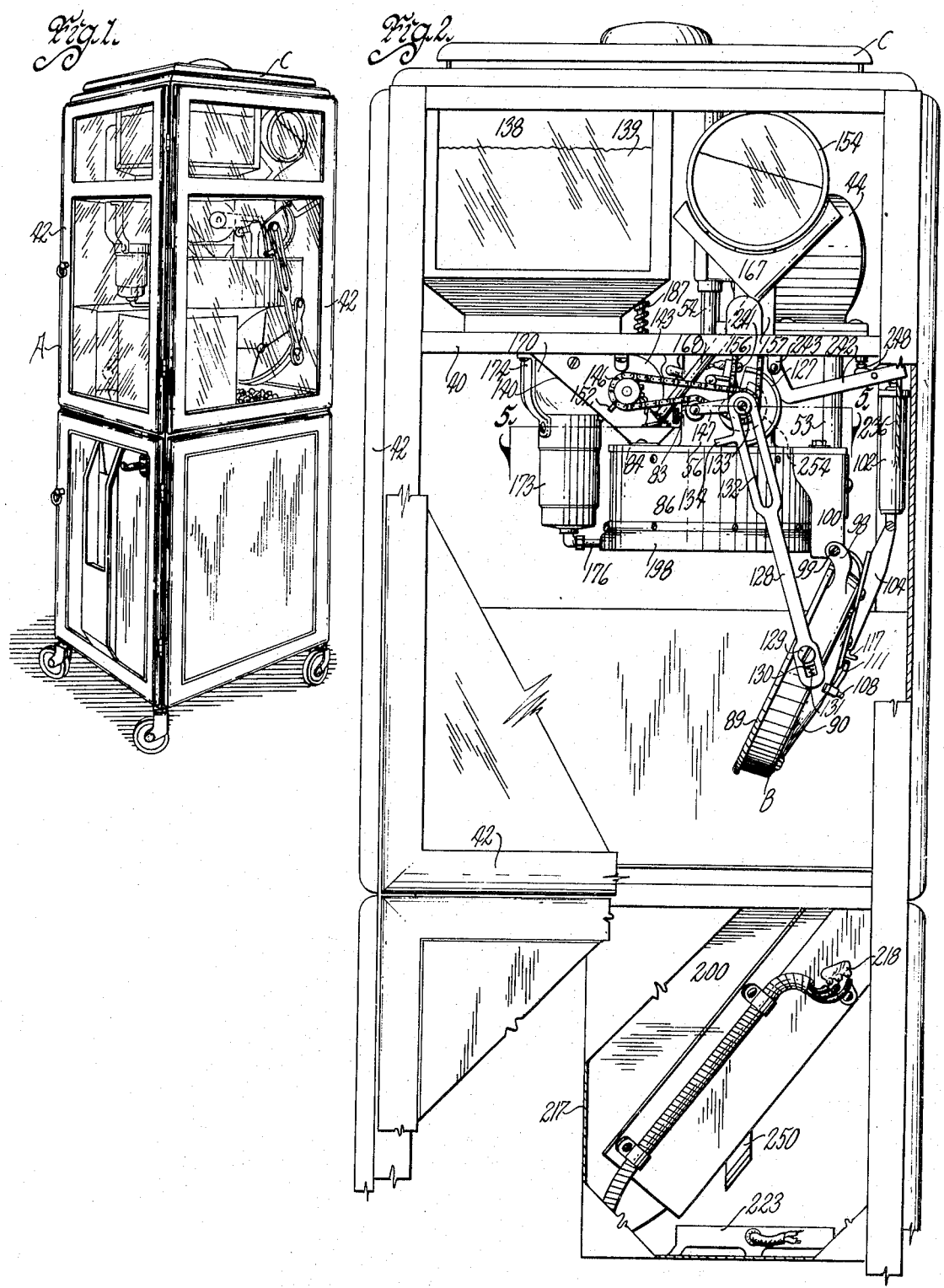
Inventors:— Robert D. Parks & Glenn Hildenbrand
by Bair, Freeman & Sinclair
Attorneys
Witness
Edw. Seeley Jan. 14, 1936.  R. D. PARKS ET AL  2,027,698
AUTOMATIC CORN POPPING MACHINE
Filed May 22, 1933   7 Sheets-Sheet 2
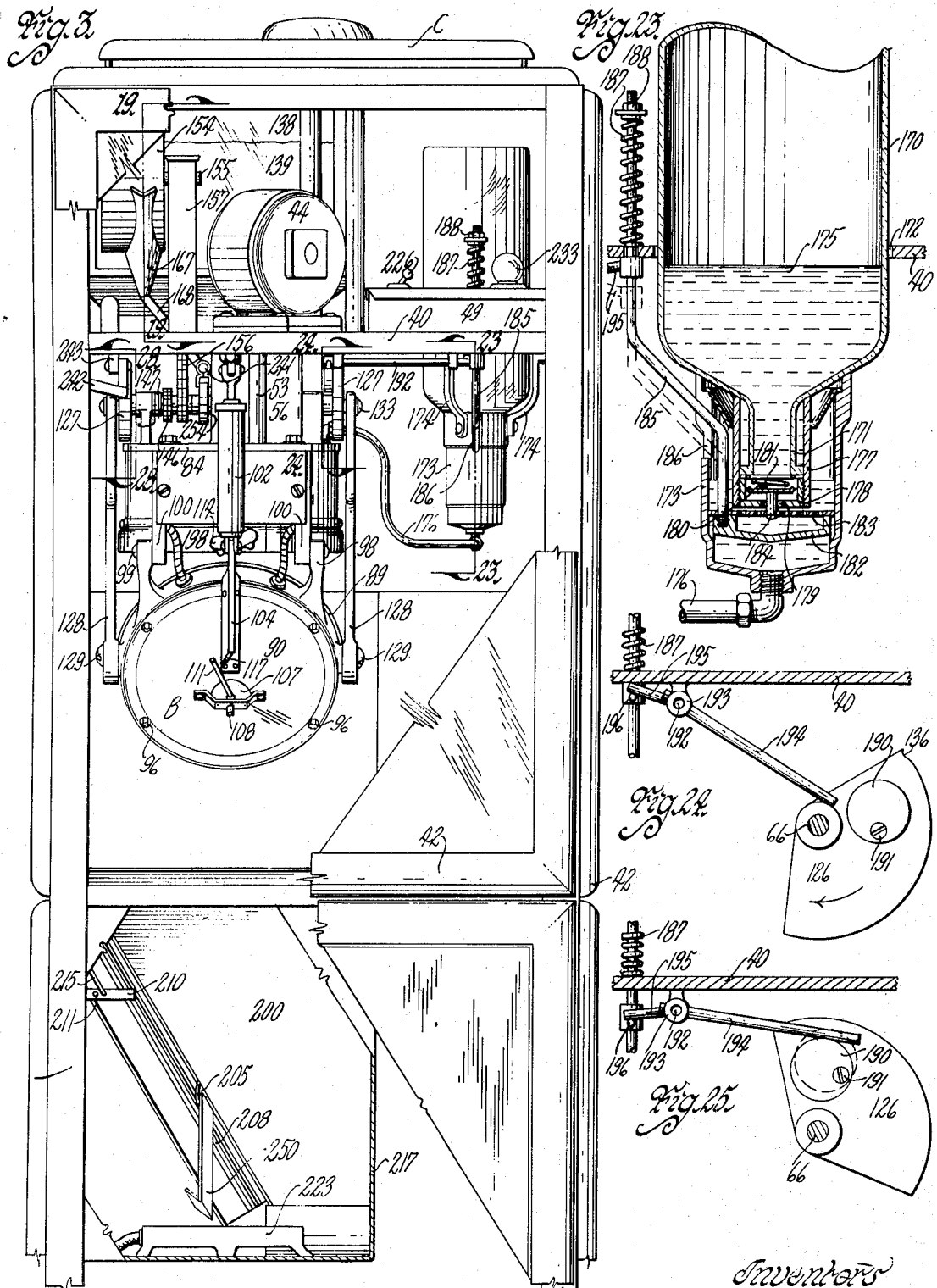
Inventors
Robert D. Parks & Glenn Hildenbrand
By Bair, Freeman & Sinclair
Attorneys
Witness
Edw. Seeley Jan. 14, 1936.  R. D. PARKS ET AL  2,027,698
AUTOMATIC CORN POPPING MACHINE
Filed May 22, 1933  7 Sheets-Sheet 3
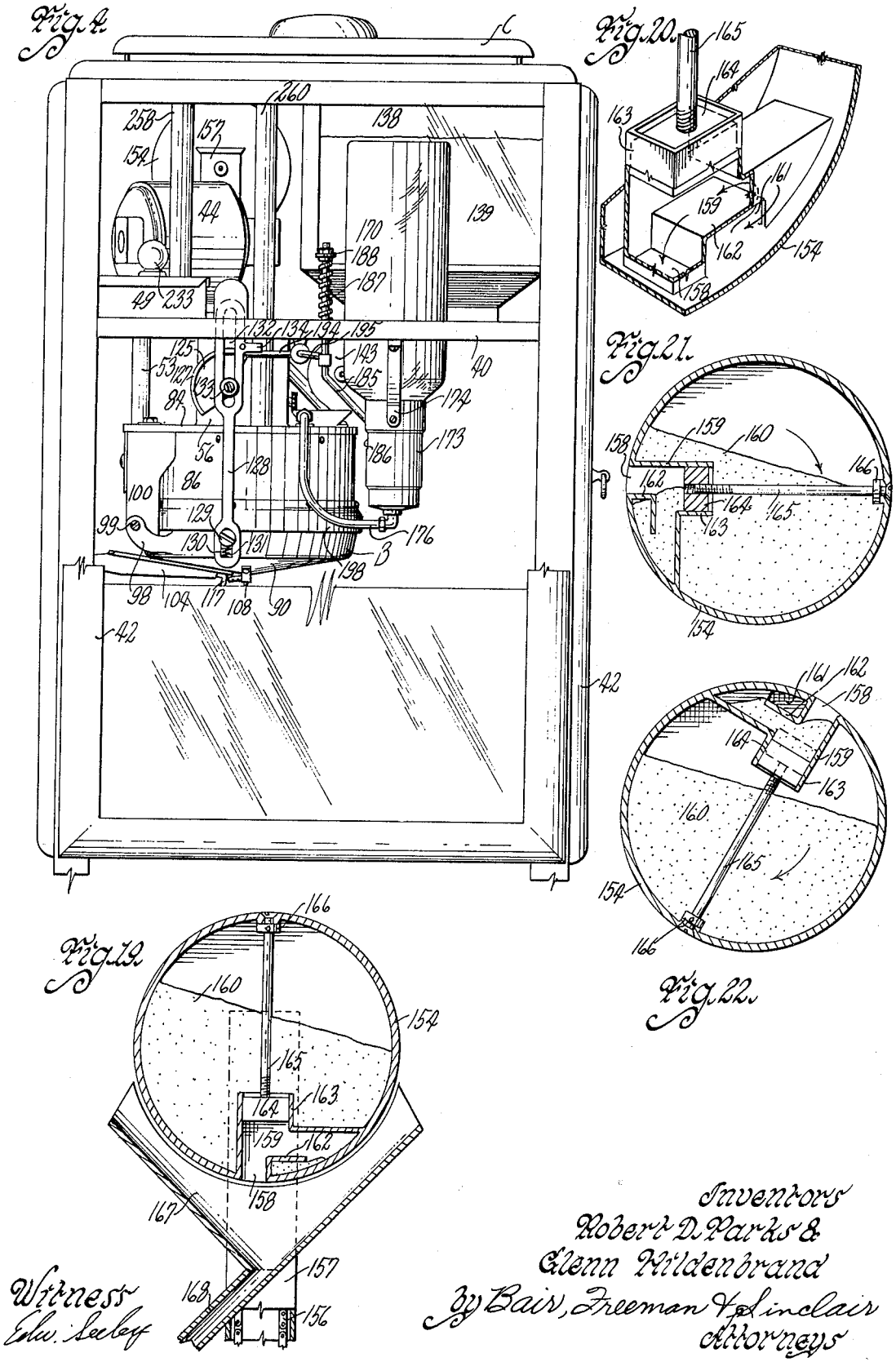
Inventors
Robert D. Parks &
Glenn Hildenbrand
By Bair, Freeman & Sinclair
Attorneys

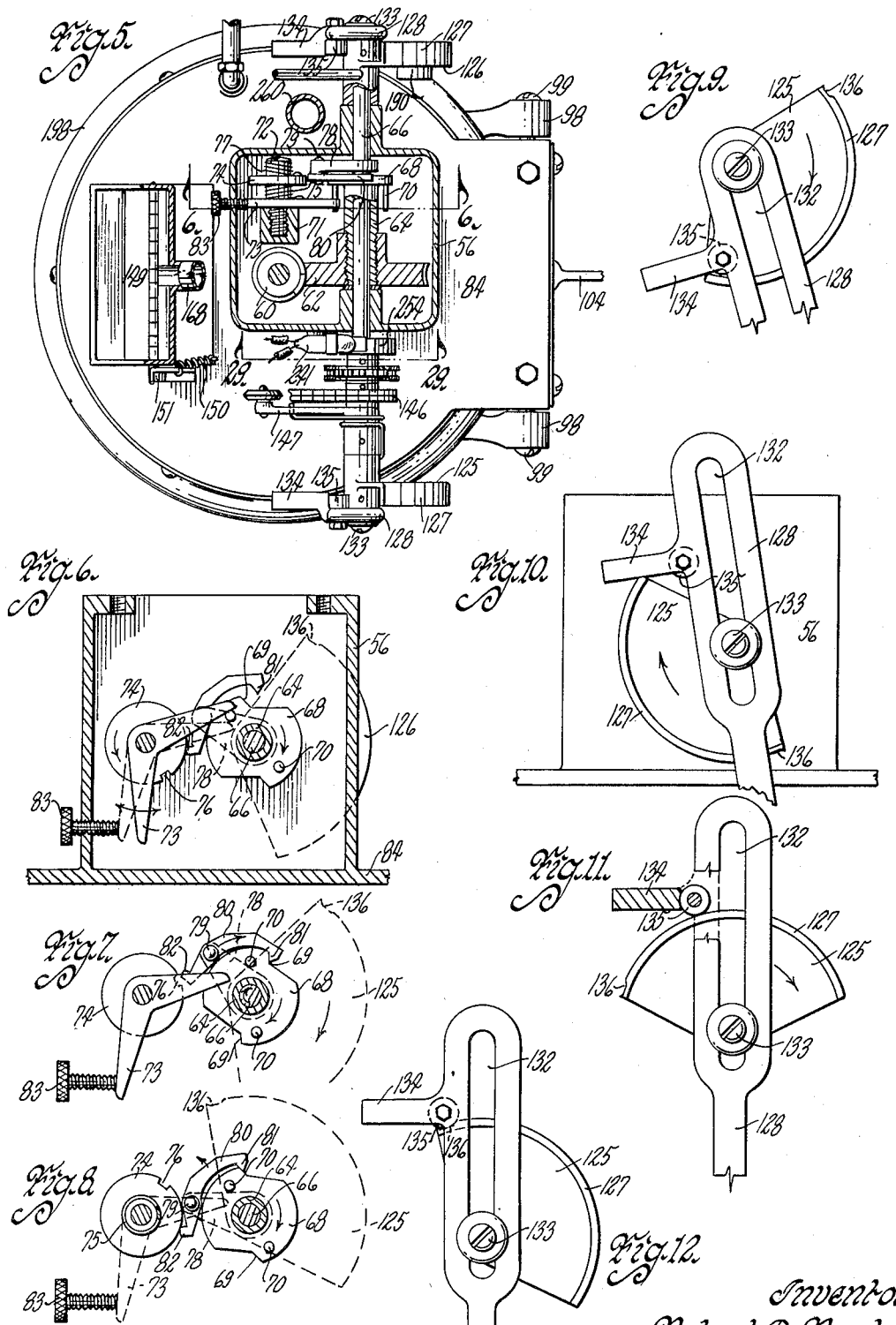

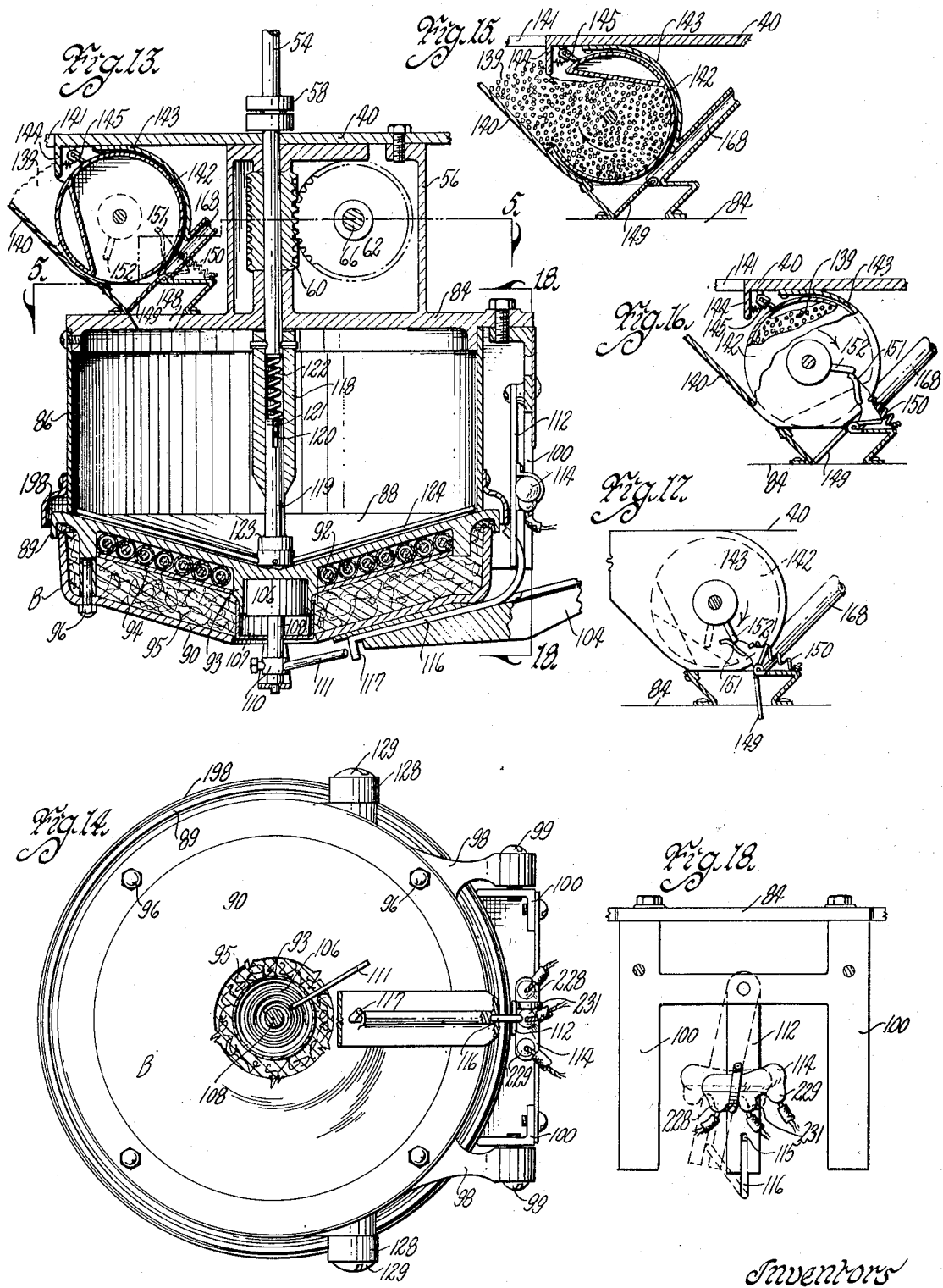

Jan. 14, 1936.   R. D. PARKS ET AL   2,027,698
AUTOMATIC CORN POPPING MACHINE
Filed May 22, 1933   7 Sheets-Sheet 6
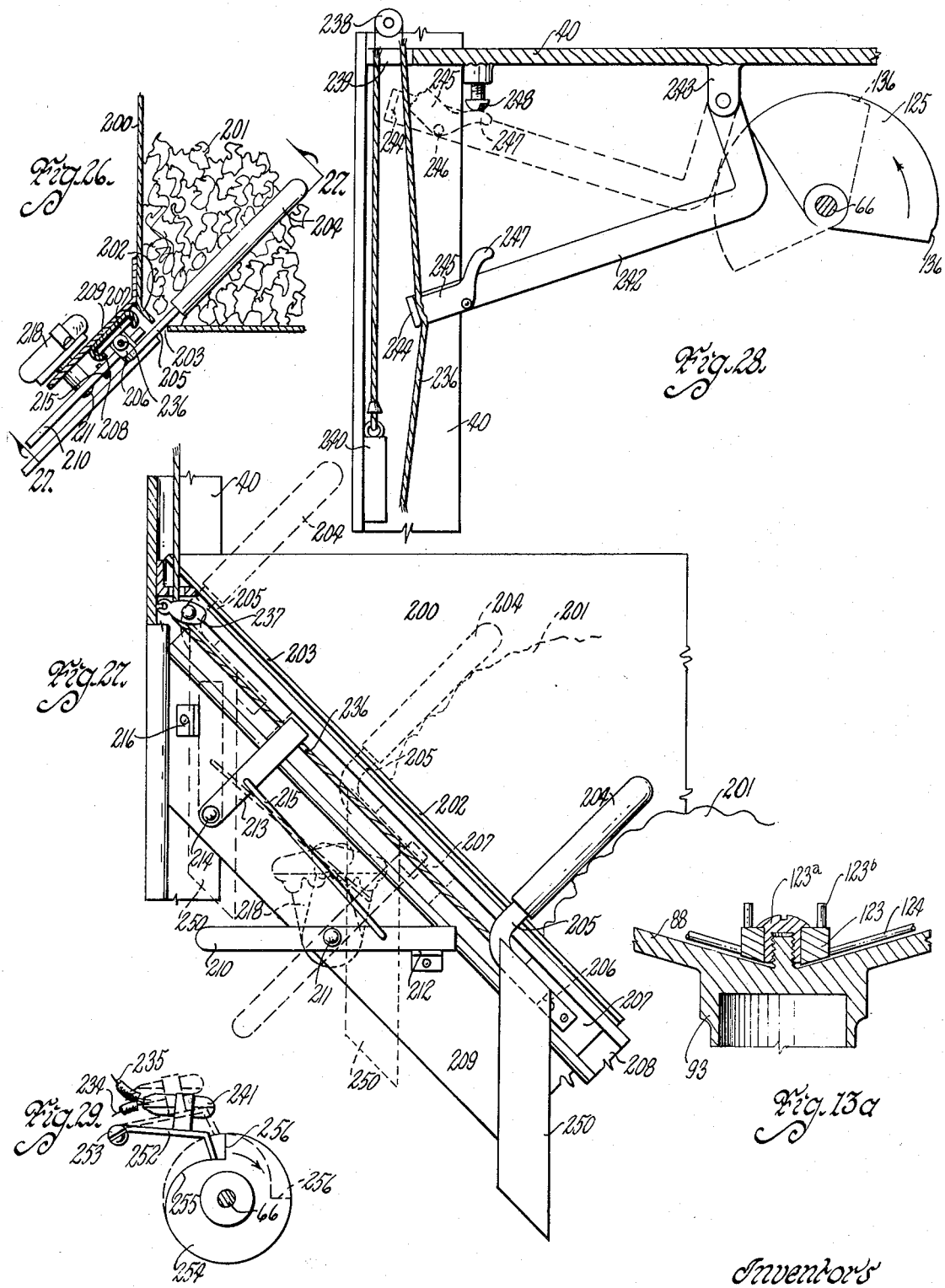

Jan. 14, 1936.  R. D. PARKS ET AL  2,027,698
AUTOMATIC CORN POPPING MACHINE
Filed May 22, 1933    7 Sheets-Sheet 7

Inventors
Robert D. Parks & Glenn Hildenbrand
by Bair, Freeman & Sinclair
Attorneys Witness
Edw. Seelert Patented Jan. 14, 1936

2,027,698

UNITED STATES PATENT OFFICE 2,027,698

AUTOMATIC CORN POPPING MACHINE

Robert D. Parks and Glenn Hildenbrand, Lohrville, Iowa, assignors, by direct and mesne assignments, of four-fifths to John P. Kavanaugh and James C. Kavanaugh, both of Waterbury, Nebr., and one-fifth to Harry S. Snyder, Sioux City, Iowa Application May 22, 1933, Serial No. 672,237

46 Claims. (Cl. 53—4)

The object of this invention is to provide novel and efficient mechanism, electrically operated and electrically heated, for popping corn.

A further object of the invention is to provide automatic popping mechanism including a popping kettle having a hinged bottom member containing an electrical heating element, with motor operated mechanism for closing the hinged bottom member, the motor being set in motion by thermostatically actuated means when the temperature in said member has reached a predetermined point, the mechanism thereafter operating to deliver to the kettle measured quantities of shelled pop corn, salt and popping oil, the motor operated mechanism acting further, after a certain predetermined time, for permitting the bottom of the kettle to move to open position for discharging the popped corn into a receptacle.

Still another object is to provide means governed by the quantity of popped corn in the receptacle for automatically controlling the popping mechanism for the purpose of discontinuing the popping operation when the receptacle is substantially filled with popped corn.

Another object is to provide improved adjustable means for measuring the desired quantity of shelled pop corn and discharging it into the popping kettle.

Another object is to provide improved adjustable means for discharging the desired quantity of salt from a container into the popping kettle.

Still another object is to provide improved means for discharging the desired quantity of popping oil, through a pumping operation, into the popping kettle.

A further object of the invention is to provide means to insure that the popping operation will not be discontinued in the midst of the operation of popping a batch of corn, thus leaving the kettle in closed position with a quantity of unpopped or partially popped corn therein.

Another and further object of the invention is to provide improved means for supplying heat to the corn in the popped corn receptacle, particularly at such times as the popping mechanism is inactive and fresh quantities of hot popped corn are not being discharged into the receptacle.

With these and other objects in view my invention consists in the construction, arrangement and combination of the various parts of my device, whereby the objects contemplated are attained, as hereinafter set forth, pointed out in our claims, and illustrated in the accompanying drawings, in which:—

Figure 1 is a perspective view of the complete machine, including the cabinet which is employed for housing not only the automatic popping mechanism but also certain packaging and vending mechanism cooperating with but forming no part of the present invention.

Figure 2 is an enlarged side elevation, partly in section, of that portion of the cabinet which houses the popping mechanism, portions of one side wall being omitted to more clearly disclose the mechanism, the popping kettle being shown in open position.

Figure 3 is a view similar to Figure 2 and at right angles thereto, or in other words—taken from the rear side of the machine.

Figure 4 is a side elevation from the opposite side of the machine to that shown in Figure 2, the popping kettle being shown in closed position.

Figure 5 is a horizontal section on the line 5—5 of Figure 2 and also on the line 5—5 of Figure 13, and illustrating particularly the driving sleeve and main shaft and elements associated therewith for controlling and operating various parts of the mechanism.

Figure 6 is a vertical section on the line 6—6 of Figure 5 illustrating means employed for imparting rotary movement from the driving sleeve to the main shaft.

Figure 7 is a view similar to Figure 6 but showing the parts in a different position.

Figure 8 is a similar view showing the parts in still another position.

Figure 9 is a detail elevation of a segmental cam and other parts employed for closing the bottom of the popping kettle, showing the parts in the positions occupied when the bottom is in open position.

Figure 10 is a similar view showing the parts in the positions occupied after the closing movement has been initiated.

Figure 11 is a similar view, partly in section, showing the parts in a still later position.

Figure 12 is a similar view showing the positions occupied by the parts when the bottom of the kettle is completely closed.

Figure 13 is a vertical section showing the kettle in closed position and also showing the driving means for the agitator and the means for measuring and discharging the shelled corn into the kettle.

Figure 13a is a detail of a part of the agitating means for the kettle.

Figure 14 is a bottom view of the popping kettle, partly in section, to show the thermostat control means for automatically closing the motor circuit and also for shutting off the current through the heating circuit at a predetermined temperature.

Figure 15 is a sectional view of the means for measuring and discharging quantities of shelled corn to the popping kettle.

Figure 16 is a sectional elevation of the same means showing the parts in a different position.

Figure 17 is a side elevation, partly in section, showing the same mechanism in the position occupied immediately after the charge of corn has been delivered.

Figure 18 is a rear elevation, partly in section, on the line 18—18 of Figure 13, showing particularly the tilting switch mechanism for controlling the heating circuit and the motor circuit.

Figure 19 is a vertical section on the line 19—19 of Figure 3, showing the rotary salt receptacle and the means for delivering measured quantities of salt to the popping kettle.

Figure 20 is a fragmentary sectional view in perspective of the salt measuring means.

Figure 21 is a vertical section similar to Figure 19 but showing the salt receptacle in a different position.

Figure 22 is a similar view showing the parts in still a different position.

Figure 23 is a vertical section of the oil reservoir and pumping means for the oil, this view being taken on the line 23—23 of Figure 3.

Figure 24 is a sectional view on the line 24—24 of Figure 3, showing the cam means for actuating the oil pumping apparatus.

Figure 25 is a similar view showing the parts in a different position.

Figure 26 is a sectional view showing a part of the popped corn receptacle and the float means for automatically controlling the popping operation in accordance with the quantity of pop corn in the receptacle.

Figure 27 is a sectional elevation on the line 27—27 of Figure 26, illustrating the float control in several different positions.

Figure 28 is an enlarged sectional view on the line 28—28 of Figure 3, showing a part of the mechanism for raising the float arm in the popped corn receptacle whenever a fresh quantity of pop corn is discharged from the kettle.

Figure 29 is an elevation, partly in section on the line 29—29 of Figure 5, showing a safety switch and the cam means for actuating it to prevent immature breaking of the motor circuit before the completion of a popping operation and thereby preventing the kettle from remaining closed with an incompletely popped charge of corn therein.

Figure 30:
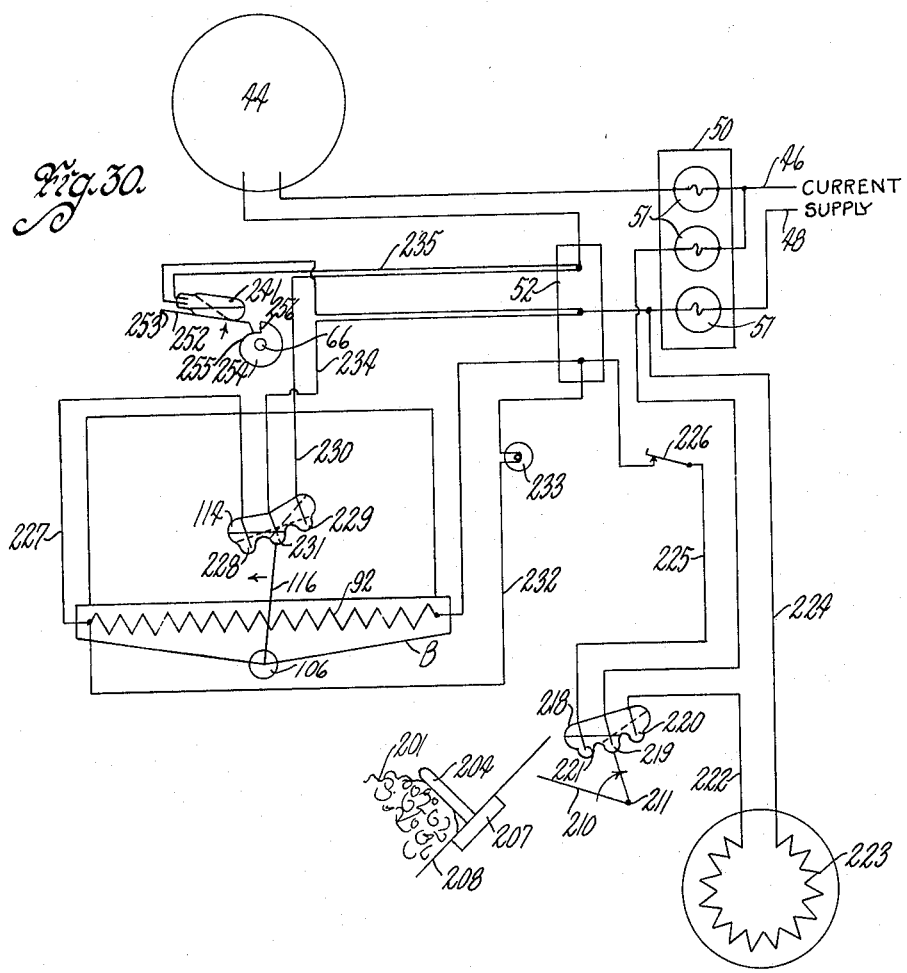
Figure 30 is a diagrammatic view showing the electrical connections employed.

The automatic popping mechanism as well as other related mechanism having to do with the packaging and vending of the pop corn is housed in a suitable cabinet designated generally by the character A. The popping mechanism is located in the upper part of the cabinet and is supported by a horizontal partition 40, some of the mechanism being above and some below this partition. The receptacle or hopper for popped corn is located at the intermediate portion of the cabinet while the mechanism controlling the packaging and vending thereof is located at the lower part. This latter mechanism forms no part of the present invention but is the subject matter of a co-pending application.

Some or all of the side walls of the cabinet preferably are removable or at least so arranged as to permit them to be opened in order to give access to the interior and the side walls of the upper portion preferably are composed largely of glazed frames 42, thus protecting the contents of this part of the cabinet and permitting the parts, as well as the operation of the mechanism, to be observed by the operator in charge and also by the general public.

Mounted upon the partition 40 is a motor 44 which is supplied with electrical current from any suitable source of supply by means of a pair of line wires 46 and 48. The line wires preferably enter a housing 49 containing a fuse block 50 carrying suitable safety fuse devices 51. The housing 49 also contains a terminal block 52 employed for making certain connections of the circuit wires.

The housing 49 is located on top of the partition 40 and below said partition is located a tube 53 through which the connections are made to the popping kettle. The motor has suitable gear connections, not shown, with a vertically arranged operating shaft 54 which extends through the partition 40 and through a gear box 56 located immediately therebelow. The operating shaft preferably has a suitable coupling device 58 intermediate its length and within the gear box there is fixed to said shaft a worm gear 60. A worm gear 62 meshes therewith and is fixed to a driving sleeve 64 rotatably mounted on the main shaft 66 which is journaled in the side walls of the gear box 56 and projects at both ends therefrom.

The main shaft 66 controls the operation of several parts of the popping mechanism and means is provided for imparting an interrupted rotation to said shaft from the driving sleeve 64. This means is illustrated particularly in Figures 5 to 8 inclusive and will now be described.

Fixed to one end of the driving sleeve 64 within the gear case 56 is a rotary cam element 68 having an irregular periphery including a pair of diametrically opposed shallow notches 69 and also having on its innermost face a pair of diametrically opposed projecting pins 70.

At one side of the driving sleeve and within the gear case is located a post 71 in which is seated a horizontally arranged pivot screw 72 and on this screw is pivotally mounted a bell crank 73 having one arm extending downwardly and another arm extending substantially horizontally toward the driving sleeve and across the orbit traversed by the pins 70 of the cam element 68.

A notched disc 74 is likewise rotatably mounted on the pivot screw 72 and is flexibly connected to the bell crank 73 by a coil spring 75. The spring has one end fixed to the bell crank and is coiled on the hub of the disc 74 between said members. The disc 74 is provided with a single peripheral notch 76 and is held against reverse rotation by an oppositely coiled spring 77 fixed at one end to said disc and coiled on the pivot pin 72 and on the opposite side of said disc from the bell crank.

Fixed to the main shaft 66 is a crank arm 78 and on this crank arm is pivoted at 79 a double ended pawl 80. The pawl has at its inner end a tooth 81 adapted to engage the notches 69 of the cam element 68 and at its outer end is provided with a substantially square lug 82 adapted to engage in the notch 76 of the disc 74. While the motor 44 is running the driving sleeve 64 and cam element 68 will be continuously rotated, thus causing the pins 70 of the latter member to engage successively with the substantially horizontal arm of the bell crank 73, and thereby oscillating said bell crank through a limited range of movement, as indicated in Figure 6. This oscillation of the bell crank causes a step by step rotary movement of the notched disc 74 through the instrumentality of the spring 75 in the direction indicated by the arrow in Figure 6, the spring 77 serving to prevent reverse movement of the notched disc when the bell crank moves back to its normal position by uncoiling action of the spring 75.

During the major part of the rotary movement of the notched disc 74, the lug 82 of the pawl 80 rides on the periphery of said disc as indicated in Figure 6, thus holding the tooth 81 of the pawl out of engagement with the cam element 68. Consequently no rotary movement is imparted to the main shaft during this period.

However, when the notch 76 of the disc reaches a point substantially on a line between the sleeve 64 and the pin 72 which marks the center of said disc, the lug 82 of the pawl is permitted to enter said notch, thereby permitting the pawl to assume a position shown in Figure 7, whereby its tooth 81 is engaged in one of the notches of the cam element 68. This establishes an operative connection between the driving sleeve 64 to which the element 68 is fastened and the main shaft 66 to which the crank arm 68 carrying the pawl 80 is fastened. This operative connection endures during substantially one revolution of the shaft 66, after which the tail lug 82 of the pawl again engages the periphery of the disc 74, forcing the pawl out of operative engagement with the element 68 in the manner indicated in Figure 8. Thereafter the operative connection remains broken and the shaft 66 stands idle until the notch 76 again comes into position for engagement by the tail lug 82 to re-establish the connection. In this manner the shaft 66 is rotated one turn at a time at periodic intervals. The length of these intervals may be regulated by adjusting the throw of the bell crank 73 whose lower arm engages the point of an adjusting screw 83 threaded in a wall of the gear case 56.

The popping kettle is located immediately below the gear case 56 and in fact portions of these members may be integrally formed as shown in Figure 13. The top member 84 of the kettle may constitute the bottom of the gear case 56 and to this top member 84 is secured the cylindrical side wall or shell 86 of the kettle.

The shell 86 of the kettle is open at its bottom and is adapted to be closed during the popping operation by a bottom member designated generally by the character B, this bottom member being hingedly mounted for swinging movement.

The bottom member B is composed of a rather heavy plate 88 which preferably is of inverted conical formation. The plate 88 is of somewhat greater diameter than the shell 86 and is formed at its periphery with a downturned flange 89 within which is fitted a substantially cup shaped shell 90. Immediately below the bottom plate 88 is located a suitable heating element 92 preferably coiled about a downwardly projecting hollow boss 93 formed at the apex of said plate. The heating element 92 is supported by an annular plate 94 and between the latter member and the cup shaped shell 90 is a body of packing 95, preferably mineral wool or the like, adapted to cause the heat from the heating element to be deflected upwardly toward the kettle. The shell 90 and its contents are held in place by means of bolts 96 connected with the bottom plate 88.

The bottom member B is provided with a pair of ears 98 which are hinged at 99 to a vertical frame 100 located at the rear side of the kettle. For permitting its contents to be discharged, the bottom member B may swing downwardly on its hinge connections as shown in Figure 2, and this downward movement is retarded by a dash-pot device 102 having a pivotal connection to an arm 104 fixed to the lower side of the bottom member.

A coil thermostat 106 is located in the hollow boss 93 at the center of the bottom plate 88 of the kettle and is enclosed at its lower side by a cup 107 preferably of light weight metal. To one end of the thermostatic coil is fixed a rotatable rod 108 having its lower end journaled in a bearing 109 fixed to the bottom of the member B. Adjustably secured to the rod 108 is a collar 110 carrying a laterally projecting arm 111.

A switch carrying plate 112 (see Figure 18) is pivotally supported at its upper end on a part of the frame 100 and this plate supports a three-pool mercury switch 114. The plate 112 is slotted at its lower end at 115 and within said slot is located the upturned end of a rock arm 116 mounted for oscillation at the lower side of the bottom member B of the kettle. The rock arm 116 extends radially of the bottom member B and has at its inner end a down-turned member 117 adapted to be engaged by the arm 111 of the thermostat device. The temperature of the popping kettle and particularly its bottom member B, which carries the heating element, affects the thermostatic coil 106 and as the temperature increases it acts to rotate the rod 108 so that the arm 111 is swung through an arc. In its swinging movement the arm 111 engages the downturned end 117 of the rock arm, causing an oscillation of the latter member whereby its upturned outer end is swung to one side, thereby swinging the switch carrying plate 112 as indicated by dotted lines in Figure 18, and tipping the switch 114. The functions and operations of the thermal controlled switch will be explained later.

The operating shaft 54 extends through the top member 84 of the popping kettle and has a sleeve 118 attached to its lower end. An agitator shaft 119 is mounted for limited sliding movement in and for rotation with the sleeve 118, said agitator shaft being slotted at its upper end to receive a pin 120 mounted transversely of the sleeve. Accidental removal of the agitator shaft from the sleeve is prevented by any suitable means such as a pin 121 across the upper end of the slotted portion of the shaft. An expansive coil spring 122 is mounted in the upper end portion of the sleeve and impinges the upper end of the agitator shaft 119, thus providing a yielding means for pressing the agitator shaft and devices carried thereby toward the bottom of the kettle.

At the center of the bottom plate 88 is rotatably mounted on a pivot 123a a head 123 having a plurality of radiating arms 124, preferably formed of wire, which are so shaped and arranged as to travel over the upper surface of the bottom plate 88 of the kettle when the bottom member B is closed and the popping mechanism in operation. The head 123 is provided with upwardly projecting pins or the like 123b adapted to engage in seats in the lower end of the agitator shaft 119 when the bottom member B of the kettle is closed, whereby the agitator devices will be caused to rotate with the shaft 119.

Fixed to opposite end portions of the main shaft 66 are segmental cam discs 125 and 126 which are substantially alike, each having a peripheral rim 127.

A pair of lifting links 128 are provided for the bottom member B of the kettle, one of said arms being located on each side of the kettle and each having a pivotal and limited sliding connection with the bottom member B by means of a screw or the like 129 extending through a slot 130 in the lower end portion of the arm. A coil spring 131 is mounted between the lower end of the slot and the pivot 129 of each arm to place the parts under tension and insure that there will be a tight joint between the shell 86 and the member B when the latter is closed.

The lifting links 128 are formed at their upper ends with elongated slots 132 and through these slots project screws or the like 133 which are seated in the ends of the shaft 66. Each lifting link 128 is formed on its forward face and intermediate the ends of the slots 132 with a right angled projection 134 and a roller 135 is pivotally mounted on the arm at the base of this projection. When the bottom member B of the kettle is open as shown in Figure 2 the cams 125 and 126 are in the positions shown in Figure 9 with the initial ends of their rims 127 resting below the projections 134 and rollers 135. Rotation of the main shaft 66 causes the cams 125 and 126 to be turned in the direction of the arrows in Figures 9, 10 and 11 and the forward ends of the rims 127, by engaging the projections 134, cause a lifting movement of the links 128, thereby effecting an upward pull on the bottom member B.

This movement continues until the cams have rotated to a point somewhat beyond that shown in Figure 10, after which the rims 127 engage beneath the rollers 135, this movement continuing as indicated in Figure 11 until the cams reach the position shown in Figure 12, whereupon the rollers 135 rest in slight notches 136 formed in the terminal portions of the rims. At this point the rotation of the shaft 66 ceases, through the operation of the timing mechanism previously described as shown in connection with Figures 6, 7 and 8, and the parts remain in this position until the popping operation is completed.

Mounted in the upper portion of the cabinet A and resting on the partition 40 is a receptacle 138 adapted to contain a quantity of shelled pop corn indicated by the numeral 139. The receptacle 138 preferably has glazed side walls and also has a sloping bottom to facilitate the passage of the shelled corn therefrom as required by the operation of the machine.

A chute 140 communicates with the lower part of the corn receptacle 138 and extends downwardly in inclined position through an opening 141 in the partition 40.

A measuring drum 142 is rotatably mounted adjacent the lower end of the chute 140 and between the inclined wall of said chute and a curved shield 143 supported in part by the partition 40. The drum 142 has an opening in its side wall through which some of the shelled corn 139 may enter the drum from the chute 140 when the drum is in a certain position as illustrated in Figure 15.

A flange 144 projects downwardly from the partition 40 at one side of the opening 141 and immediately in front of the measuring drum 142, thus forming a restricted passage between the lower end of said flange and the inclined wall of the chute 140, for the purpose of guiding the shelled corn into the drum. A spring-held wiper blade 145 is provided, having one edge engaging the surface of the drum 142 and designed to prevent the passage of any of the kernels of corn into the narrow space between the drum and the shield 143 when the drum is rotated.

Rotation of the measuring drum 142 is accomplished by sprocket gearing 146 operatively connecting it with the main shaft 66 and preferably a spring-pressed tightener device 147 is supported by said shaft and is adapted for engagement with the chain of the sprocket gearing as shown in Figure 2. When the rotary movement of the main shaft 66 commences, under the influence of the timing mechanism previously described, the measuring drum 142 is in the position shown in Figure 17, or in other words—is in such position as to receive a charge of corn from the receptacle through the chute 140. Through the rotation of the shaft 66 the drum is rotated in the direction indicated by the arrows in Figures 16 and 17 until the opening in the wall of the drum is directed downwardly, whereupon the contents of the drum are discharged through an opening 148 in the top member 84 and are received in the kettle which by this time has been closed by action of the lifting links 128.

However, we prefer to provide a hinged gate 149 which normally extends over the opening 148 and prevents escape of vapor or stream from the kettle therethrough. The gate 149 is yieldingly held in closed position by a spring 150 and is provided with an upwardly extending arm 151 adjacent the end of the chute 140 within which the measuring drum is enclosed. A wiper arm 152 is fixed to and projects laterally from the hub of the drum and is adapted to engage the arm 151 just before the drum reaches the point of discharge. This engagement results in opening the gate 149 against the influence of the spring 150, as shown in Figure 17, thereby permitting the charge of corn to be delivered from the measuring drum to the kettle, after which the gate is closed by action of the spring. At this time the rotary movement of the shaft 66 ceases and the drum comes to rest, remaining in this position until the next cycle of movements occurs and giving plenty of time for discharge of its contents. During the early part of the next cycle the drum receives a new charge while rotating as shown in Figure 15. It will be noted that the leading edge of the drum 142 lifts out of the corn before coming near any other metal part, and there is no chance for kernels to catch. The level of the corn is determined by the flange 144, thus determining the amount of the charge received in the drum.

There is also mounted in the upper portion of the cabinet and above the partition 40 a receptacle for salt, this receptacle being in the nature of a rotary cylindrical chamber 154 mounted for rotation on a shaft 155. The shaft and chamber are rotated by sprocket gearing 156 connected with the main shaft 66, a part of said gearing being enclosed in a case 157 which also serves to provide a support and bearing for the shaft 155.

The rotary salt chamber 154 is provided at one point in its periphery with a discharge opening 158 and a measuring cup 159 is built into the chamber adjacent and in position to cover said opening from the inside. The measuring cup 159 is of less width than the chamber 154 which is adapted to contain a quantity of salt designated by the number 160 to be used in the popping operation. The cup 159 is formed at its exposed side with a small lateral opening 161 through which some of the salt in the chamber may enter, the filling of the cup occurring during that portion of the rotary movement of the chamber in which the opening 161 is covered by the salt in the chamber. The cup 159 is formed internally with a right angled partition 162 which surrounds the filling opening 161 and serves to separate said opening from the discharge opening 158. The portion enclosed by the partition 162 communicates at its rearward side by a restricted passageway with the interior of the cup and its function is to permit the salt coming into the opening 161 from passing immediately out through the opening 158 when the latter opening is directed downwardly as in Figure 19. As the chamber is rotated in the direction of the arrows in Figure 21 and 22, the measuring cup travels through an arc and the filling opening 161 is finally lifted out of the body of salt within the chamber. As the measuring cup against approaches the lowermost point the charge of salt contained therein is discharged through the opening 158, and at about the same time the refilling of the cup commences by passage of salt through the opening 161.

It is desirable to provide means for adjusting the capacity of the measuring cup 159 and for that purpose the inner wall of the cup is formed with a tubular extension 163 within which a block 164 is adjustably mounted for the purpose of closing the inner end of the extension. The block 164 has a threaded connection with a screw or bolt 165 extending diametrically across the chamber and having its head end provided with a swivel connection at 166 with the opposite wall of the chamber. The block 164 is angular in section and is not permitted to rotate within the extension 163 and hence when the screw 166 is turned, this turning movement causes the block to be moved in one direction or another within the extension 163, as indicated in Figure 22, thereby regulating the total capacity of the measuring cup and its extension and thereby providing means to control the quantity of salt which will be delivered at each rotation of the chamber.

A hopper device 167 is mounted immediately below the salt chamber 154 and is adapted to receive the quantities of salt discharged through the opening 158. A tube 168 leads downwardly from the bottom of the hopper 167 and communicates at its lower end with the bottom of the chute 148, immediately below the point where the charges of shelled corn are deposited as previously explained. The arrangement therefore is such that a charge of salt of the desired quantity is delivered to the kettle through the opening 148 at the same time that a charge of shelled corn is delivered thereto. The measuring of salt is accomplished without the use of any movable means except the receptacle itself, thereby eliminating trouble which might be caused by the abrasive effect of the salt in the operation of the device.

A receptable for popping oil is also mounted in the cabinet, this being in the nature of a glass bottle 170 or jar having a reduced neck 171. The bottle 170 is mounted in inverted position and extends partially through an opening 172 in the partition 40, being supported by a metallic cylinder 173 which is in turn supported by brackets 174 secured to the partition. The receptacle 170 is adapted to contain a quantity of oil suitable for popping purposes and designated by the numeral 175. This oil is discharged from time to time in measured quantities to the popping kettle through a pipe 176 leading from the bottom of the cylinder 173 to the upper portion of the kettle.

The neck 171 of the oil reservoir is enclosed in a metallic sleeve 177, the outer end of which is closed by a screw plug or cap 178 having a small discharge opening 179 therethrough. The discharge opening 179 normally is closed by a valve plate 180 urged to closing position by a spring 181.

Within the lower end of the cylinder 173 is mounted a reciprocable piston 182 and above said piston rests a perforated plate 183 carrying at its center a pin 184. The pin 184 is adapted to extend through the opening 179 into engagement with the valve plate 180 for the purpose of holding said valve in open position against the influence of the spring 181 and permitting some of the oil to flow from the reservoir to the lower part of the cylinder. Since the reservoir is imperforate except for the small submerged opening 179, only a limited quantity of oil will flow into the cylinder and the quantity of oil in the cylinder will be replaced automatically as it is used, and remain at a constant level. The cylinder has a tight fit with the piston in its lower part, but is enlarged in diameter in its upper part to permit downflow of oil.

A rod 185 is fixed at one end of the piston 182 and extends upwardly and then laterally through a slotted opening 186 in the upper part of the wall of the cylinder. The rod 185 extends slidably through the partition 40 and at its upper end is provided with a coil spring 187 impinging at one end on the partition and at the other end on a nut 188 threaded on the rod. It is the function of the spring 187 to urge the rod 185 upwardly, thereby tending to hold the piston 182 in its uppermost position as shown in Figure 23.

On the inner face of the segmental cam 126 of the main shaft is mounted a cam disc 190 as shown in Figures 24 and 25. The disc 190 is eccentrically attached to the segmental cam by a screw 191, thus permitting the position of the cam to be adjusted as indicated in Figure 25.

A rock shaft 192 is journaled in bearings 193 supported below the partition 40. Near one end the rock shaft 192 is provided with an arm 194 which extends across the inner face of the segmental cam 126 and ordinarily rests on the hub of said cam as shown in Figure 24.

At its other end the rock shaft 192 is provided with an oppositely extended tripping arm 195 which extends across the piston rod 185 and rests above a pin 196 projecting from said arm.

When the segmental cam 126 is turned by rotation of the main shaft 66 as previously described, the cam disc 190 thereon comes into engagement with the arm 194 and lifts its free end as shown in Figure 25, thereby rocking the shaft 192 and causing the tripping arm 195 to exert downward pressure on the pin 196, the effect of which is to move the piston rod 185 downward against the influence of the spring 187. This action causes a downward movement of the piston 182 in its cylinder, thereby forcing or pumping a quantity of oil from the cylinder through the pipe 176 to the popping kettle. The oil is thus discharged into the kettle prior to the beginning of the popping operation so that the corn is popped in the desired quantity of oil.

An annular skirt 198 is attached to the lower portion of the shell 86 of the popping kettle and overlaps the joint between the kettle and its bottom member B when the latter is closed. It is the function of the skirt 198 to shield the joint and to prevent any oil which may escape therefrom from being projected against the walls of the cabinet and particularly against the glass portions of the walls through which the interior of the cabinet is visible.

The length of the popping period is determined by the interval between the rotary movements of the main shaft 66 which in turn is controlled by the timing mechanism previously described in connection with Figures 6, 7 and 8. It will be remembered that the shaft 66 makes but one turn at a time, this movement being accomplished by the engagement of the pawl 80 with the cam ratchet 68 and that the interval between these movments is governed by the notched timing disc 74, the step by step movement of which is accomplished by engagement of the pins 70 with the bell crank 73.

After a period of rest during which a popping operation is carried out, the first result of a renewed operation of the main shaft 66 is the turning of the segmental cams 125 and 126 away from the position shown in Figure 12, thus permitting the rollers 135 to pass out of the notches 136, and thereby releasing the lifting links 128 and permitting the bottom member B of the kettle to drop by gravity, its downward movement being retarded by the dash-pot device 102.

When the bottom member B of the kettle is opened its contents are discharged into a hopper-like receptacle 200 located in an intermediate portion of the cabinet A. The body of popped corn is designated by the numeral 201. The hopper has sloping side walls meeting in a narrow rear wall 202 which slopes toward the front of the cabinet and is formed with a longitudinal slot 203 narrow enough to prevent the passage of popped corn therethrough.

A float arm 204 is arranged in the hopper and is adapted to rest against the upper side of the pile of popped corn 201 as shown particularly in Figure 27. The float arm 204 is formed with a narrow shank 205 which extends slidably through the slot 203 and is bent at right angles between its ends and also offset laterally at 206 (see Figure 26). The terminal portion of the shank 205 is attached to a plate 207 which is arranged for sliding movement in a channeled track 208 arranged parallel with the narrow bottom wall 202 and substantially beneath the slot 203. The track 208 and other elements are carried by a bracket plate 209 fixed to and depending in an oblique position from a wall of the hopper 200.

A switch lever 210 is fulcrumed intermediate its ends at 211 on the central portion of the bracket plate 209 and is normally arranged in substantially horizontal position as shown by solid lines in Figure 27, forward movement of the lever past the horizontal position being prevented by a stop 212.

A tripping arm 213 is pivoted at 214 on the bracket plate 209 above the position of the switch lever and is pivotally connected to said switch lever by a link 215. The normal position of the tripping arm 213 is substantially at right angles to the slotted bottom wall 202 of the hopper but it is capable of being moved to substantially vertical position as indicated by dotted lines in Figure 27, its movement past the vertical position being prevented by a stop 216.

The switch lever 210 carries a mercury switch 218 which normally, when said switch lever is in horizontal position, is tipped slightly forwardly or to the right as viewed in Figure 27, and thereby establishes a circuit through the heating element 92 of the popping kettle and also the circuit through the motor 44. The mercury switch 218 is provided with three terminals, the intermediate one being designated by the numeral 219 and being connected with one of the main current lines 46.

The rearmost terminal of the switch, designated 220, is connected with a conductor 222 which is in turn connected with a heating unit 223 located in a housing 217 partially enclosing the receptacle for popped corn, said unit having its opposite side connected by a conductor 224 to the opposite line wire 48 (see Figure 30). The heating unit 223 is designed to supply heat to the body of popped corn in the receptacle but it is in operation only at such times as the switch 218 is tipped rearwardly, which occurs when the popping mechanism is inactive due to the presence of a sufficient quantity of popped corn. The heating unit 223 is not needed at times when the popping operation is going on fairly continuously because fresh quantities of hot pop corn are being delivered at intervals to the receptacle.

The forward terminal 221 of the switch 218 is connected with a conductor 225 which contains a manual switch 226 for controlling the operation of the mechanism and which conductor is connected to one side of the heating element 92 of the popper. The opposite side of said heating element is connected by a conductor 227 to one outside terminal 228 of the thermal controlled switch 114 previously described. The other outside terminal 229 of the thermal controlled switch is connected by a conductor 230 with one side of the motor, thus completing the circuit through the motor in connection with the main line conductor 46 as illustrated by the diagram in Figure 30.

A light wire 232 is in parallel with the connections to the heating element 92 of the popper and contains a tell-tale light 233 which enables the operator to observe at a glance whether or not the heating element is in operation.

The central terminal 231 of the thermal controlled switch is connected in parallel with the motor 44 by a conductor 234, a conductor 235, and a safety switch 241, which will hereinafter be described. This switch in general includes a tiltably mounted tube having two terminals at one end, both of which are exposed in the normal position of the switch or when the machine is not in operation.

The float arm 204 normally rests lightly against the body of popped corn 201 in the receptacle and means is provided for moving it upwardly in connection with each operation of the popping mechanism, whereby it may thereafter assume a new position against the enlarged body of corn.

A draft cord 236 is fixed at one end to the shank 205 of the float arm beneath the hopper and extends upwardly substantially parallel with the slotted bottom wall 202.

Near the rear side of the cabinet the cord 236 passes around a direction pulley 237 and thence upwardly at the rear of the cabinet and over a pulley 238 located near the top of the cabinet, extending through an opening 239 in the partition 40. After passing over the pulley 238 the cord passes back through the opening 239 and has a small weight 240 attached to its free end.

A bell crank arm 242 has its short end pivotally attached and supported by a bracket 243 depending from the partition 40. The free end of the long member of the bell crank arm 242 is bent laterally to form a jaw 244. A gripping lever 245 is pivoted on the arm 242 at a point adjacent the jaw 244 and designated by the numeral 246. One end of the lever 245 is adapted to cooperate with the jaw 244 in gripping the draft cord 236 as shown in Figure 28. The opposite end of the lever 245 is bent upwardly and then laterally to form a tail piece 247, which is adapted at times to engage a screw 248 adjustably mounted beneath the partition 40. This contact serves to oscillate the gripping lever 245 to release the cord when the bell crank arm is swung upwardly.

The elbow of the bell crank arm 242 is arranged near the segmental cam 125 and when said cam is operated in the direction of the arrow in Figure 28, at each revolution of the main shaft 66, there is an engagement of the leading edge of said cam with the short member of the bell crank arm 242. This engagement causes the bell crank to be swung upwardly to the dotted line position shown in Figure 28, thereby causing an upward draft on the cord 236, terminating when the gripping lever 245 is released by contact with the stop screw 248. This upward movement of the draft cord 236 causes the float arm 204 to be raised to the uppermost dotted line position of Figure 27, the carrier plate 207 sliding in the track 208.

About this time in the operation a new charge of popped corn is deposited in the hopper by opening of the cover member B of the popping kettle, the new level of the pop corn being indicated by dotted lines in Figure 27. When the gripping lever 245 is released from the draft cord the bell crank arm 242 falls by gravity (after the segmental cam 125 has passed out of contact therewith) and the lever 245 takes a new grip on the cord in a different position and ready for another pull thereon.

During the interval while the cord is released the float arm 204 travels downwardly along the slotted bottom wall of the hopper and comes to rest in a new position against the enlarged body of corn, as indicated by the intermediate dotted showing of Figure 27. A stabilizing arm 250 is fixed to and depends from the shank of the float arm and its function is to supply additional weight to assist the float arm in moving down to its new position, and also to balance the shank so that the plate 207 will slide freely in its track.

When the float arm 204 is moved upwardly as just described by the pull on the draft cord 236, the offset portion 206 of its shank engages the free end of the tripping arm 213 and moves the latter member upwardly to vertical position as indicated by dotted lines in Figure 27. Because of the link 215, the switch lever 210 is also oscillated to the dotted line position, thus tilting the switch 218 to the left in Figure 27 or to the right as viewed in Figure 30. This tilting movement serves to break for the time being the connection through the conductor 225 to the heating element 92 of the popper.

When the cord 236 is released and the float arm 204 again moves downwardly, the offset portion 206 of its shank engages the upper end of the switch lever 210 and oscillates the latter, and also the switch 218 back to the normal position, providing the downward travel of the float arm is of such extent as to engage said lever which is located fairly near the upper end of the sloping hopper bottom. In the event such engagement occurs, the circuit through the heating element 92 is re-established by tilting of the switch 218 to its original position and thereafter the popping operation continues. However, when the body of popped corn 201 in the hopper has been built up to a position somewhere near the top, the float arm 204 is not permitted to travel downwardly far enough to engage the switch lever 210 and consequently the popping operation is discontinued until such time as the removal of pop corn from the receptacle permits the float arm to move down to the position of the switch lever.

By this arrangement means is provided for automatically discontinuing the popping operation when the popped corn receptacle is substantially filled. This stopping of the popping operation by breaking the circuit through the heating element 92 also results eventually in a stopping of the motor 44 and a suspension of the movements of the parts controlled by said motor.

The safety switch device previously referred to is provided for the purpose of insuring that the popping operation will not be interrupted while in process but will be completed before the circuit is broken through the motor. Such interruption of the operation and the popping process would occur at times after the kettle had been closed and recharged, at the time when the filling of the popped corn receptacle is completed, by automatic operation of the switch 218 as above described, or by manual opening of the switch 226 when the operator desires to stop the machine.

The thermal switch 114 as previously stated has three terminals and the central terminal, which is connected to the safety switch 241, is always covered by the mercury in the bulb of the switch. The thermal switch has three different positions as indicated in the diagram of Figure 30 and two of these positions are shown in Figure 18.

When the popping devices are cold and there is no current through the heating element 92, the switch carrying plate 112 hangs in vertical position as shown by solid lines in Figure 18, the position of the mercury in the switch at this time also being indicated by the solid line in Figure 30. In this position the right hand terminal 229 which is connected directly with the motor 44 is exposed and the motor circuit therefore broken. At such time, commencing with the point of initiating the operation of the mechanism, there is also an interrupted circuit to the motor through the central terminal 231, conductor 234, safety switch 241 and conductor 235, this circuit likewise being broken on account of the position of the switch 241 at that time as in Figure 30. Consequently the motor will not start when the main switch 226 is first closed.

Supposing now that the manual switch 226 is closed for the purpose of putting the machine in operation. This establishes a circuit through the line wire 46, float controlled mercury switch 218 (which is in normal position unless the popped corn hopper is full), conductor 225, heating element 92, conductor 227, thermal controlled switch 114, conductor 234 and line wire 48 so that the bottom member B of the kettle is heated through current in the element 92. The current also flows through the parallel light wire 232 and the lamp 233 is lighted.

When the temperature of the bottom member B of the kettle has been raised to a point where the popping operation may commence, the thermostat 106 has been affected to such extent that the rod 108 is rotated for turning the arm 111 and thereby rocking the control rod 116 so that the plate 112 and switch 114 are moved to the position indicated by dotted lines in Figure 18. At this time the switch 114 is substantially horizontal and all of its terminals are covered by the mercury, thereby establishing a circuit to the motor through the right hand terminal 229 and conductor 230.

The motor then commences to function and in its operation it serves to actuate the driving sleeve 64 and also the agitating means in the kettle. The operation of the motor also serves to impart rotary movement to the main shaft 66 at suitable intervals, one revolution at a time, as previously described. At each revolution of the shaft 66 the kettle is closed, is supplied with charges of shelled or unpopped corn, salt and oil, the kettle remaining closed during the period of rest of said shaft so that the popping operation is carried on until the next rotary movement of the shaft begins, whereupon the popped corn is discharged to the receptacle 200.

In the event the temperature of the kettle and especially the bottom member B becomes too great, or reaches a predetermined point, the thermostat 106 moves the rod 108 and arm 111 so far around that the lug 117 on the rock shaft 116 causes the latter member to swing the switch carrying plate 112 still farther to the left than is indicated by dotted lines in Figure 18.

In other words—the thermal controlled switch 114 then assumes such position that the left hand terminal 228 is uncovered, thereby interrupting the circuit through the heating element 92, and permitting the popping process to continue by utilizing the heat then present, the motor continuing to operate. When the broken circuit has caused a cooling off to a certain point, the thermostat device relaxes and permits the switch 114 to move back to normal popping position.

Turning again to the float controlled switch 218 it will be noted that the movement of this switch to position for breaking the circuit through the heating element 92, because of a filling of the receptacle 220, will cause a termination of all functions of the mechanism. However, this termination will not occur immediately because there is still enough heat in the bottom member B and in the kettle to carry on the popping operation for a time, and so long as this condition exists the thermal controlled switch 114 will remain in the dotted line position of Figure 18, thereby completing a circuit to the motor through the terminal 229 and conductor 230. However, when the parts have cooled off to such extent that the switch 114 is permitted to swing back to the solid line position of Figure 18, or in other words—to the position shown in Figure 30, then the circuit just referred to is broken by uncovering of the terminal 129. It is at this point that the function of the safety switch 241 comes into play and it serves to prevent an immediate stoppage of the motor and mechanism operated thereby because such stoppage, if it occurred during the popping of a batch of corn, would result in leaving the kettle in closed position and containing an unpopped or partially popped charge of corn. At the position of the switch 114 just referred to the terminal 231 is covered by the mercury and there is still a circuit to the motor through the safety switch device under said conditions.

The safety switch 241 is mounted on a plate 252 (see Figure 29) pivoted at 253 on a screw seated in the wall of the gear case 56. The plate 252 extends toward and has a downturned free end substantially overlying the main shaft 66.

Fixed to the shaft 66 is a notched cam 254, the greater part of whose periphery is on the arc of a circle of sufficient diameter to hold the free end of the switch-carrying plate 252 in elevated position as indicated by dotted lines in Figure 29. When the plate 252 is so elevated, the safety switch 241 is tipped to such position that both of its terminals are covered by the mercury, thereby establishing a circuit through the conductors 234 and 235, and thus serving to keep the motor in operation so long as the switch is in this position.

The regular arcuate periphery of the cam 254 is interrupted by a notch having an irregularly curved wall 255 merging into the arcuate surface and serving to gradually lift the free end of the plate 252 to position for rendering the safety switch operative. This lifting movement begins shortly after the beginning of each successive rotary movement of the cam shaft 66, and the switch is held by the cam in circuit closing position until about the time the rotation of the shaft ceases. At this point the arcuate periphery of the cam ends abruptly in a radial shoulder 256 constituting the other wall of the notch and when the cam reaches this point the downturned end of the plate 252 is permitted to drop, thus tilting the switch to the solid line position in Figure 29. In this position the terminals of the switch are uncovered, thus breaking the previously established circuit to the motor through the conductors 234 and 235 and causing a stoppage of the operation of the mechanism.

By this time the current popping operation has been completed, by stored heat, and the popped corn discharged from the kettle. Under these conditions the bottom member B remains open and there is no operation for recharging the kettle, because both circuits through the motor 44 are now broken.

In connection with each stated revolution of the main shaft 66 there also occurs the upward pulls on the draft cord 236 and the repositioning of the float arm 204 which comes to rest in contact with the successively enlarged bulk of popped corn 201 in the receptacle, until such time as the receptacle is substantially filled. Thereupon, the operation of the mechanism is discontinued through tilting of the float controlled switch 218, which then acts in its new position to establish a circuit through the heating element 232 alone, for keeping the popped corn warm in the receptacle.

We have also provided means to permit the escape of vapors and the like from the upper part of the machine, this being accomplished by making the cabinet A with a top wall C which is slightly raised above the side walls to provide a narrow space between these members. We also provide vent tubes such as 258 which opens at its lower end to the partition 40 and has its upper end located beneath the top wall C of the cabinet. Another vent tube 260 affords communication between the top plate 84 of the popping kettle and the top of the cabinet.

In the machine forming the subject matter of this invention we have therefore provided efficient means for automatically popping corn under proper conditions and keeping a supply on hand at all times in the receptacle 200 and also for keeping this supply of pop corn in good condition for delivery to the customers. The mechanism and the controls for the various electric circuits make it possible to supply the proper temperature conditions for the best results in popping and also to deliver to the popping kettle at the proper time the desired quantities of unpopped corn, salt, and popping oil so that the corn when popped will be thoroughly mixed with the salt and supplied with the oil to make it thoroughly palatable. We have further provided against contingencies which might result in the discharge to the popped corn receptacle of imperfectly popped corn and have provided means for keeping the pop corn warm and crisp, regardless of interruptions which may occur in the continuity of the popping operations, assuming of course that the supply of current through the main line wires is not broken.

By means of these various features we insure that a sufficient quantity of corn may be kept in good condition at all times for customers. This is particularly desirable in connection with an automatic popping machine having automatic vending mechanism, which is true of our machine, thereby dispensing with the need for an operator in attendance at all times.

The arm 204 is referred to as a float arm because it has the function of controlling the switch 218 in accordance with the level or quantity of popped corn in the receptacle 200, although it of course does not automatically assume a higher position when such quantity is increased. In other words, this member and parts associated therewith are thus referred to for convenience of identification and because of the analogy in use to devices which do automatically conform their positions to the level of substances with which they are used.

Some changes may be made in the construction and arrangement of the parts of our device without departing from the real spirit and purpose of our invention, and it is our intention to cover by our claims, any modified forms of structure or use of mechanical equivalents, which may be reasonably included within their scope.

We claim as our invention:—

1. A machine of the character set forth comprising a popping kettle having a hinged bottom member, a heating element in said bottom member, a motor, a main shaft adapted to be driven by said motor, a container for unpopped corn, containers for salt and for popping oil, means operable by said shaft for delivering measured quantities of corn, salt and oil from their respective containers to the popping kettle when its bottom member is closed, means operable by said shaft for releasing the bottom member for discharging popped corn from the kettle, a receptacle into which the popped corn is received from the kettle, said receptacle having a sloping wall, a float device movable along said sloping wall and adapted to come to rest against the body of popped corn in the receptacle, means connected with said main shaft for raising said float device each time a fresh quantity of popped corn is delivered to the receptacle, and for thereafter releasing said float device whereby it may come to rest against the enlarged body of popped corn, a switch controlling the circuit through said heating element, and means operable by a part on said float device for causing said switch to assume circuit-breaking position at such time as the float is caused to remain at a certain predetermined elevation due to the presence of the desired quantity of popped corn in the receptacle.

2. A machine of the character set forth comprising a popping kettle having a hinged bottom member, a heating element in said bottom member, a motor, a main shaft adapted to be driven by said motor, a container for unpopped corn, containers for salt and for popping oil, means operable by said shaft for delivering measured quantities of corn, salt and oil from their respective containers to the popping kettle when its bottom member is closed, means operable by said shaft for releasing the bottom member for discharging popped corn from the kettle, a receptacle into which the popped corn is received from the kettle, said receptacle having a sloping wall, a float device movable along said sloping wall and adapted to come to rest against the body of popped corn in the receptacle, means connected with said main shaft for raising said float device each time a fresh quantity of popped corn is delivered to the receptacle, and for thereafter releasing said float device whereby it may come to rest against the enlarged body of popped corn, a switch controlling the circuit through said heating element, and a tripping device operable by a part on said float device in each direction of its movement for moving said switch respectively to circuit-breaking and circuit-making position, so that the switch fails to move to the latter position when the float device is held in elevated position by enlargement of the body of popped corn to the desired quantity, thereby automatically terminating the popping operation.

3. A machine of the character set forth comprising a popping kettle having a hinged bottom member, a heating element in said bottom member, a motor, a main shaft adapted to be driven by said motor, a container for unpopped corn, containers for salt and for popping oil, means operable by said shaft for delivering measured quantities of corn, salt and oil from their respective containers to the popping kettle when its bottom member is closed, means operable by said shaft for releasing the bottom member for discharging popped corn from the kettle, a receptacle into which the popped corn is received from the kettle, said receptacle having a sloping wall, a float device movable along said sloping wall and adapted to come to rest against the body of popped corn in the receptacle, means connected with said main shaft for raising said float device each time a fresh quantity of popped corn is delivered to the receptacle, and for thereafter releasing said float device whereby it may come to rest against the enlarged body of popped corn, a switch controlling the circuit through said heating element, means operable by a part on said float device for causing said switch to assume circuit-breaking position at such time as the float is caused to remain at a certain predetermined elevation due to the presence of the desired quantity of popped corn in the receptacle, and a safety switch adapted to temporarily maintain the circuit through said motor, after movement of said controlling switch to circuit breaking position, until such time as the popping operation then in process has been completed, said safety switch thereafter being movable to circuit-breaking position by a part operated by said main shaft.

4. A machine of the character set forth comprising a popping kettle having a hinged bottom member, a heating element in said bottom member, a motor, a main shaft adapted to be driven by said motor, a container for unpopped corn, containers for salt and for popping oil, means operable by said shaft for delivering measured quantities of corn, salt and oil from their respective containers to the popping kettle when its bottom member is closed, means operable by said shaft for releasing the bottom member for discharging popped corn from the kettle, a receptacle into which the popped corn is received from the kettle, said receptacle having a sloping wall, a float device movable along said sloping wall and adapted to come to rest against the body of popped corn in the receptacle, means connected with said main shaft for raising said float device each time a fresh quantity of popped corn is delivered to the receptacle, and for thereafter releasing said float device whereby it may come to rest against the enlarged body of popped corn, a switch controlling the circuit through said heating element, and means operable by a part on said float device for causing said switch to assume circuit-breaking position at such time as the float is caused to remain at a certain predetermined elevation due to the presence of the desired quantity of popped corn in the receptacle, a heating element for the popped corn receptacle, the circuit through the last named element being closed by said controlling switch only when in circuit-breaking position with respect to the popping element, whereby heat is supplied to the popped corn when the popping operation is discontinued.

5. A machine of the character set forth comprising a popping kettle having a hinged bottom member, a heating element in said bottom member, a motor, a main shaft adapted to be driven by said motor, a container for unpopped corn, containers for salt and for popping oil, means operable by said shaft for delivering measured quantities of corn, salt and oil from their respective containers to the popping kettle when its bottom member is closed, means operable by said shaft for releasing the bottom member for discharging popped corn from the kettle, a thermostat device carried by the bottom member of the kettle, a three-position switch, the first position of said switch establishing a circuit through said heating element but not through the motor, the second position establishing circuits through both, and the third position establishing a circuit through the motor but not the heating element, and means operable by said thermostat when the temperature of the bottom member is sufficient for the popping operation, for moving said switch from first to second position, the last named means also acting to move the switch to third position when the temperature passes above a certain point.

6. A machine of the character set forth comprising a popping kettle having a hinged bottom member, a heating element in said bottom member, a motor, a main shaft adapted to be driven by said motor, a container for unpopped corn, containers for salt and for popping oil, means operable by said shaft for delivering measured quantities of corn, salt and oil from their respective containers to the popping kettle when its bottom member is closed, means operable by said shaft for releasing the bottom member for discharging popped corn from the kettle, a receptacle for receiving the popped corn, a float-controlled switch adjacent said receptacle for automatically interrupting the circuit through the heating element when popped corn in the receptacle reaches a certain height, a thermostat device carried by the bottom member of the kettle, a three-position switch, the first position of said switch establishing a circuit through said heating element but not through the motor, the second position establishing circuits through both and the third position establishing a circuit through the motor but not the heating element, means operable by said thermostat, when the temperature of the bottom member is sufficient for the popping operation, for moving said switch from first to second position, the last named means also acting to move the switch to third position when the temperature passes above a certain point, and a safety switch adapted to temporarily maintain the circuit through said motor, after movement of said controlling switch to circuit breaking position, until such time as the popping operation then in process has been completed, said safety switch thereafter being movable to circuit-breaking position by a part operated by said main shaft, said safety switch being in circuit through said three-position switch in all three positions of the latter.

7. A machine of the character set forth comprising a popping kettle, an electrical heating element therefor, a motor-driven main shaft, means for delivering a measured quantity of unpopped corn to said kettle, means for discharging the popped corn from said kettle, a receptacle into which the popped corn is received from the kettle, said receptacle having a sloping wall, a float device movable along said sloping wall and adapted to come to rest against the body of popped corn in the receptacle, means connected with said main shaft for raising said float device each time a fresh quantity of popped corn is delivered to the receptacle, and for thereafter releasing said float device whereby it may come to rest against the enlarged body of popped corn, a switch controlling the circuit through said heating element, and means operable by a part on said float device for causing said switch to assume circuit-breaking position at such time as the float is caused to remain at a certain predetermined elevation due to the presence of the desired quantity of popped corn in the receptacle.

8. A machine of the character set forth comprising a popping kettle, an electrical heating element therefor, a motor-driven main shaft, a controlling switch therefor, means for delivering a measured quantity of unpopped corn to said kettle, means for discharging the popped corn from said kettle, and a safety switch adapted to temporarily maintain the circuit through the motor, after movement of said controlling switch to circuit breaking position, until such time as the popping operation then in process has been completed, said safety switch thereafter being movable to circuit-breaking position by a part operated by said main shaft.

9. A machine of the character set forth comprising a popping kettle, an electrical heating element therefor, a motor-driven main shaft, means for delivering a measured quantity of unpopped corn to said kettle, means for discharging the popped corn from said kettle, and a safety switch adapted to temporarily maintain the circuit through the motor, after movement of said controlling switch to circuit breaking position, until such time as the popping operation then in process has been completed, said safety switch thereafter being movable to circuit-breaking position by a part operated by said main shaft, a controlling switch therefor, a heating element for the popped corn receptacle, the circuit through the last named element being closed by said controlling switch only when in circuit-breaking position with respect to the popping element, whereby heat is supplied to the popped corn when the popping operation is discontinued.

10. A machine of the character set forth comprising a popping kettle having a hinged bottom member, a heating element in said bottom member, a motor, a main shaft, a driving sleeve loosely mounted on said shaft, gear connections between said motor and the driving sleeve, timed clutch connections from said sleeve for turning said shaft a limited amount at stated intervals, agitating means in the kettle driven by said motor, means connected with said shaft for moving and holding the bottom member of the kettle in closed position, means operated by said shaft for delivering a quantity of shelled pop corn to the kettle after its bottom member is closed, the beginning of each rotary movement of the shaft operating to release the holding means for the bottom member of the kettle, whereby the popped corn is discharged therefrom.

11. A machine of the character set forth comprising a popping kettle having a hinged bottom member, a heating element in said bottom member, a motor, a main shaft, a driving sleeve loosely mounted on said shaft, gear connections between said motor and the driving sleeve, timed clutch connections from said sleeve for turning said shaft a limited amount at stated intervals, agitating means in the kettle driven by said motor, means connected with said shaft for moving and holding the bottom member of the kettle in closed position, separate means operated by said shaft for delivering measured quantities of shelled pop corn, salt and popping oil to the kettle after its bottom member is closed, the beginning of each rotary movement of the shaft operating to release the holding means for the bottom member of the kettle, whereby the popped corn is discharged therefrom.

12. A machine of the character set forth, comprising a popping kettle having a hinged bottom member, a heating element in said bottom member, a motor, a main shaft, a driving sleeve loosely mounted on said shaft, gear connections between said motor and the driving sleeve, timed clutch connections from said sleeve for turning said shaft a limited amount at stated intervals, agitating means in the kettle driven by said motor, a segmental cam fixed to said shaft, and a lifting link pivoted at one end to the bottom member of the kettle and being slotted in its upper portion for sliding engagement with said shaft, said link having means adapted to be engaged by said cam for raising said bottom member as the shaft is rotated, and for holding it in closed position during the popping operation, the commencement of the next succeeding movement of the shaft causing said cam to pass out of holding engagement and permitting said bottom member to move to open position, means operated by said shaft for delivering a quantity of shelled pop corn to the kettle after its bottom member is closed, the beginning of each rotary movement of the shaft operating to release the holding means for the bottom member of the kettle, whereby the popped corn is discharged therefrom.

13. A machine of the character set forth comprising a popping kettle having a hinged bottom member, a heating element in said bottom member, a motor, a main shaft, a driving sleeve loosely mounted on said shaft, gear connections between said motor and the driving sleeve, timed clutch connections from said sleeve for turning said shaft a limited amount at stated intervals, agitating means in the kettle driven by said motor, means connected with said shaft for moving and holding the bottom member of the kettle in closed position, a container for shelled pop corn, a rotary measuring device communicating with said container and also with the popping kettle, driving connections between said shaft and the measuring device for delivering the desired quantity of corn to the kettle after its bottom member is closed, the beginning of each rotary movement of the shaft operating to release the holding means for the bottom member of the kettle, whereby the popped corn is discharged therefrom.

14. A machine of the character set forth comprising a popping kettle having a hinged bottom member, a heating element in said bottom member, a motor, a main shaft, a driving sleeve loosely mounted on said shaft, gear connections between said motor and the driving sleeve, timed clutch connections from said sleeve for turning said shaft a limited amount at stated intervals, agitating means in the kettle driven by said motor, means connected with said shaft for moving and holding the bottom member of the kettle in closed position, separate containers for shelled pop corn, salt, and popping oil, measuring means for each container communicating with the popping kettle, and separate means operated by said shaft for actuating the several measuring means and delivering substances to the kettle after its bottom member is closed, the beginning of each rotary movement of the shaft operating to release the holding means for the bottom member of the kettle, whereby the popped corn is discharged therefrom.

15. A machine of the character set forth comprising a popping kettle having a hinged bottom member, a heating element in said bottom member, a motor, a main shaft, a driving sleeve loosely mounted on said shaft, gear connections between said motor and the driving sleeve, timed clutch connections from said sleeve for turning said shaft a limited amount at stated intervals, agitating means in the kettle driven by said motor, a segmental cam fixed to said shaft, and a lifting link pivoted at one end to the bottom member of the kettle and being slotted in its upper portion for sliding engagement with said shaft, said link having means adapted to be engaged by said cam for raising said bottom member as the shaft is rotated, and for holding it in closed position during the popping operation, the commencement of the next succeeding movement of the shaft causing said cam to pass out of holding engagement and permitting said bottom member to move to open position, a container for popping oil, a pump device connected with the oil container and having communication with the popping kettle, means operated by said segmental cam for actuating said pump device, means operated by said shaft for delivering a quantity of shelled pop corn to the kettle after its bottom member is closed, the beginning of each rotary movement of the shaft operating to release the holding means for the bottom member of the kettle, whereby the popped corn is discharged therefrom.

16. In an automatic popping machine, a popping kettle, means for supplying heat thereto, a container for shelled pop corn, said container having an outlet at its bottom, a measuring drum rotatably mounted and having an opening in its side adapted to register with said outlet, a chute leading to said kettle, the opening of said drum being arranged to discharge into said chute at one point in the rotation of the drum, a spring held gate normally extending across said chute, a lever fixed to said gate, and a wiper member on said drum adapted to engage said lever for opening the gate approximately simultaneously with the discharge of material from said drum to the chute.

17. In an automatic popping machine, a popping kettle, means for supplying heat thereto, a rotary drum adapted to contain salt, said drum being formed with a discharge opening in its periphery and also being formed with a measuring cup mounted on its inner wall enclosing said opening, said cup being formed with a lateral entrance opening through which substance may pass from the drum when in one position, and a chute leading to the popping kettle, the discharge opening of said drum being adapted to register with said chute at one point in the rotation of the drum.

18. In an automatic popping machine, a popping kettle, means for supplying the heat thereto, a rotary drum adapted to contain salt, said drum being formed with a discharge opening in its periphery and also being formed with a measuring cup mounted on its inner wall enclosing said opening, said cup being formed with a lateral entrance opening through which substance may pass from the drum when in one position, a chute leading to the popping kettle, the discharge opening of said drum being adapted to register with said chute at one point in the rotation of the drum, said measuring cup being formed with a tubular projection, and a block arranged for sliding adjustment in said projection to provide means for regulating the effective capacity of the cup.

19. In an automatic popping machine, a popping kettle, means for supplying heat thereto, said kettle having a hinged bottom member, motor driven means including a rotary member for moving said bottom member to closed position for the popping operation, a container for popping oil, a cylinder adapted to receive oil from said container, a tube leading from said cylinder to the popping kettle, a piston arranged for travel in said cylinder and having a rod extending outside thereof, spring means engaging the piston rod for urging the piston in one direction, said rod being formed with a projection, a tripping member adapted to engage said projection for moving the rod and piston in opposition to the spring means, and a cam on said rotary member adapted to actuate said tripping rod, whereby a charge of oil is delivered to the kettle in the operation of said motor driven means, at a time subsequent to the action of said means in closing the bottom member of the kettle.

20. In an automatic popping machine, a popping kettle, means for supplying heat thereto, an agitator arranged for continuous operation in the kettle during the popping operation, a motor, a shaft driven by said motor and having connections with said agitator, a main shaft, a driving sleeve loosely mounted on said shaft, driving connections between the motor driven shaft and said sleeve, means operated by said main shaft for delivering popping material to the kettle in charges for successive popping operations, and driving connections between the driving sleeve and main shaft for imparting limited rotary movement to the latter at stated intervals.

21. In an automatic popping machine, a shaft designed for limited rotary movement at stated intervals, a driving sleeve on said shaft designed for continuous rotation, and timed driving connections between said sleeve and shaft, said connections comprising an arm on said shaft, a pawl pivoted on said arm, a notched cam fixed to said sleeve and adapted to be engaged at times by said pawl, a disc rotatably mounted and adapted normally to engage said pawl and prevent its engagement with the cam, a bell-crank arranged for oscillation, pins on the face of said cam adapted to engage and oscillate said bell-crank, yielding means for imparting step-by-step rotary movement to said disc in one direction as the bell-crank is oscillated, said disc being formed with a peripheral notch to receive a part on the pawl at one point in its rotation, thereby permitting said pawl to move into engagement with a notch of said cam and remain in such engagement until the shaft has performed substantially one revolution, whereupon said pawl again engages the un-notched periphery of the disc and is thrown out of engagement thereby.

22. In an automatic popping machine, a shaft designed for limited rotary movement at stated intervals, a driving sleeve on said shaft designed for continuous rotation, and timed driving connections between said sleeve and shaft, said connections comprising an arm on said shaft, a pawl pivoted on said arm, a notched cam fixed to said sleeve and adapted to be engaged at times by said pawl, a disc rotatably mounted and adapted normally to engage said pawl and prevent its engagement with the cam, a bell-crank arranged for oscillation, pins on the face of said cam adapted to engage and oscillate said bell-crank, yielding means for imparting step-by-step rotary movement to said disc in one direction as the bell-crank is oscillated, said disc being formed with a peripheral notch to receive a part on the pawl at one point in its rotation, thereby permitting said pawl to move into engagement with a notch of said cam and remain in such engagement until the shaft has performed substantially one revolution, whereupon said pawl again engages the unnotched periphery of the disc and is thrown out of engagement thereby, and adjustable stop means for regulating the throw of said bell-crank.

23. A machine of the character set forth comprising a popping kettle, a heating element for said kettle, a motor, a shaft adapted to be driven by said motor, means operable by said shaft for discharging popped corn from said kettle, a receptacle into which the popped corn is received from the kettle, said receptacle having a sloping wall, a float device movable along said sloping wall and adapted to come to rest against the body of popped corn in said receptacle, means connected with said shaft for raising said float device each time a fresh quantity of popped corn is delivered to said receptacle and for thereafter releasing said float device whereby it may come to rest against the enlarged body of popped corn, a switch controlling the circuit through said heating element and means operable by a part on said float device for causing said switch to assume circuit breaking position at such time as the float device is caused to remain at a certain predetermined elevation due to the presence of the desired quantity of popped corn in said receptacle.

24. A machine of the character set forth comprising a popping kettle, a heating element for said kettle, a motor, a shaft adapted to be driven by said motor, means operable by said shaft for discharging popped corn from said kettle, a receptacle into which the popped corn is received from the kettle, a float device movable within said receptacle and adapted to come to rest against the body of popped corn in said receptacle, means connected with said shaft for raising said float device each time a fresh quantity of popped corn is delivered to said receptacle and for thereafter releasing said float device whereby it may come to rest against the enlarged body of popped corn, a switch controlling the circuit through said heating element and means operable by a part on said float device for causing said switch to assume circuit breaking position at such time as the float device is caused to remain at a certain predetermined elevation due to the presence of the desired quantity of popped corn in said receptacle.

25. A machine of the character set forth comprising a popping kettle, a heating element therefor, a motor, a shaft adapted to be driven by said motor, means operable by said shaft for discharging popped corn from said kettle, a receptacle into which said popped corn is received from said kettle, a float movable within said receptacle and adapted to come to rest against the body of popped corn in said receptacle, means connected with said shaft for raising said float each time additional popped corn is delivered to said receptacle and for thereafter releasing said float whereby it may come to rest against the enlarged body of popped corn, a switch controlling the circuit through said heating element and a tripping device operable by said float in each direction of its movement for moving said switch respectively to circuit breaking and circuit making positions so that said switch fails to move to the latter position when said float is held in elevated position by enlargement of the body of popped corn to the desired quantity, thereby automatically terminating the popping operation.

26. A machine of the character set forth comprising a popping kettle, a motor, a shaft adapted to be driven by said motor, means operable by said shaft for discharging popped corn from said kettle, a receptacle into which the popped corn is received from said kettle, a float movable within said receptacle and adapted to come to rest against the body of popped corn therein, means connected with said shaft for raising said float each time an additional quantity of popped corn is delivered to said receptacle and for thereafter releasing said float whereby it may come to rest against the enlarged body of popped corn and means operable by said float when it is held in an elevated position by enlargement of the body of popped corn to the desired quantity to automatically terminate the popping operation.

27. A machine of the character set forth comprising a popping kettle, a heating element therefor, a motor, a shaft adapted to be driven by said motor, means operable by said shaft for discharging popped corn from said kettle, a receptacle into which the popped corn is received from the kettle, a float movable within said receptacle and adapted to come to rest against the body of popped corn therein, means connected with said shaft for raising said float each time a fresh quantity of popped corn is delivered to said receptacle and for thereafter releasing said float whereby it may come to rest against the enlarged body of popped corn, a switch controlling the circuit through said heating element, means operable by said float for causing said switch to assume circuit breaking position at such time as the float is caused to remain at a certain predetermined elevation due to the presence of the desired quantity of popped corn in the receptacle and a safety switch adapted to temporarily maintain the circuit through said motor after movement of said controlling switch to circuit breaking position until such time as the popping operation then in process has been completed, said safety switch thereafter being moved to circuit breaking position by said shaft.

28. A machine of the character set forth comprising a popping kettle, heating means therefor, a motor, a shaft adapted to be driven by said motor, means operable by said shaft for discharging popped corn from said kettle, a receptacle for receiving the popped corn, a float movable within said receptacle and adapted to come to rest against the body of popped corn therein, means connected with said shaft for raising said float each time a fresh quantity of popped corn is delivered to said receptacle and for thereafter releasing said float whereby it may come to rest against the enlarged body of popped corn, a member controlling said heating means for said kettle, means operable by said float for causing said member to assume non-operating position at such time as the float is caused to remain at a certain predetermined elevation due to the presence of the desired quantity of popped corn in said receptacle and heating means for the popped corn receptacle, said last named heating means being rendered operative by said controlling member only when in position for rendering said first heating means inoperative whereby heat is supplied to the popped corn when the popping operation is discontinued.

29. In an automatic popping machine, a popping kettle, means for periodically heating and emptying said kettle, a receptacle receiving batches of corn after the same have been emptied from said kettle and means responsive to low and high level of the popped corn in the receptacle to respectively initiate and terminate operation of the popping kettle.

30. A machine of the character set forth comprising a popping kettle, a heating element in said kettle, a motor, a shaft adapted to be driven by said motor, means operable by said shaft for discharging popped corn from said kettle, a thermostat device carried by said kettle, a three-position switch, the first position of said switch establishing a circuit through said heating element but not through said motor, the second position establishing circuits through both and the third position establishing a circuit through said motor but not through said heating element and means operable by said thermostat device when the temperature of said kettle is sufficient for the popping operation, for moving said switch from first to second position, said last named means also acting to move said switch to third position when the temperature passes above a certain point.

31. A machine of the character set forth comprising a popping kettle, a heating element for said kettle, a motor, a shaft adapted to be driven by said motor, means operable by said shaft for discharging popped corn from said kettle, a receptacle for receiving the popped corn, a float controlled switch adjacent said receptacle for automatically interrupting the circuit through the heating element when popped corn in the receptacle reaches a certain height, a thermostat device carried by said kettle, a three position switch, the first position of said switch establishing a circuit through said heating element but not through said motor, the second position establishing circuits through both and the third position establishing a circuit through said motor but not through said heating element, means operable by said thermostat device, when the temperature of said kettle is sufficient for the popping operation, for moving said switch from first to second position, said last named means also acting to move said switch to third position when the temperature passes above a certain point and a safety switch adapted to temporarily maintain the circuit through said motor, after movement of said controlling switch to circuit breaking position, until such time as the popping operation then in process has been completed, said safety switch thereafter being movable to circuit breaking position by a part operated by said shaft.

32. A machine of the character set forth comprising a popping kettle, an electrical heating element therefor, a motor driven shaft, means for discharging popped corn from said kettle, a receptacle into which the popped corn is received from said kettle, a float device movable within said receptacle and adapted to come to rest against the body of popped corn therein, means connected with said shaft for raising said float device each time a fresh quantity of popped corn is delivered to the receptacle and for thereafter releasing said float device whereby it may come to rest against the enlarged body of popped corn, a switch controlling the circuit through said heating element and means operable by a part on said float device for causing said switch to assume circuit breaking position at such time as the float device is caused to remain at a certain predetermined elevation due to the presence of the desired quantity of popped corn in said receptacle.

33. A machine of the character set forth, comprising a popping kettle having a hinged bottom member, a motor, a shaft, a driving sleeve loosely mounted on said shaft, gear connections between said motor and said driving sleeve, timed clutch connections from said sleeve for turning said shaft a limited amount at stated intervals, a segmental cam fixed to said shaft and a lifting link pivoted at one end to said bottom member of said kettle and being slotted in its upper portion for sliding engagement with said shaft, said link having means adapted to be engaged by said cam for raising said bottom member as said shaft is rotated and for holding it in closed position during the popping operation, the commencement of the next succeeding movement of said shaft causing said cam to pass out of holding engagement and permitting said bottom member to move to open position, the beginning of each rotary movement of said shaft operating to release the holding means for said bottom member of said kettle whereby the popped corn is discharged therefrom.

34. In an automatic popping machine, a popping kettle, a container for shelled pop corn, said container having an outlet at its bottom, a measuring drum rotatably mounted and having an opening adapted to register with said outlet, the opening of said drum being arranged to discharge into said kettle at one point in the rotation of said drum, a spring held gate normally preventing discharge to said kettle, a lever fixed to said gate and a wiper member on said drum adapted to engage said lever for opening said gate approximately simultaneously with the discharge of material from said drum to said kettle.

35. In an automatic popping machine, a popping kettle and a rotary drum adapted to contain salt, said drum being formed with a discharge opening and with a measuring cup adjacent said opening, said cup being formed with an entrance opening independent of said discharge opening through which substance may pass from said drum when in one position, the discharge opening of said drum being adapted to discharge into said kettle at one point in the rotation of the drum.

36. In an automatic popping machine, a popping kettle, a rotary drum adapted to contain salt, said drum being formed with a discharge opening and with a measuring cup mounted to enclose said opening, said cup being formed with an entrance opening independent of said discharge opening through which substance may pass from the drum when in one position, the discharge opening of said drum being adapted to discharge a portion of the contents of the drum into said popping kettle at one point in the rotation of the drum, said measuring cup being formed with a tubular projection and a block arranged for sliding adjustment therein to provide means to regulate the effective capacity of said cup.

37. In an automatic popping machine, a popping kettle, motor driven means including a rotary member, a container for popping oil, a cylinder adapted to receive oil from said container, a tube leading from said cylinder to the popping kettle, a piston arranged for travel in said cylinder and having a rod extending outside thereof, spring means engaging the piston rod for urging the piston in one direction, said rod being formed with a projection, a tripping member adapted to engage said projection for moving the rod and piston in opposition to the spring means and a cam on said rotary member adapted to actuate said tripping member whereby a charge of oil is delivered to the kettle in a predetermined position of said motor driven means during operation thereof.

38. In an automatic popping machine, a popping kettle, a motor, a shaft, a driving sleeve driven by said motor and loosely mounted on said shaft, means operated by said shaft for delivering popping material to said kettle in charges for successive popping operations and driving connections between said driving sleeve and said shaft for imparting limited rotary movement to the latter at stated intervals.

39. In an automatic popping machine, a shaft designed for limited rotary movement at stated intervals, a notched cam on said shaft designed for continuous rotation and timed driving connections between said cam and said shaft, said connections comprising an arm on said shaft, a pawl pivoted on said arm, said cam being adapted to be engaged at times by said pawl, a member mounted and adapted to normally engage said pawl to prevent its engagement with said cam, an arm arranged for oscillation, a projection on said cam adapted to engage and oscillate said last mentioned arm and means for imparting step-by-step movement to said member in one direction by oscillation of said last mentioned arm, said member being formed with means to coact with said pawl at one position of the movement of the member, thereby permitting the pawl to move into engagement with the notch of said cam and to remain in such engagement until said shaft has performed substantially one revolution whereupon said pawl again engages the portion of said member which throws it out of engagement with said cam.

40. In an automatic popping machine, a shaft designed for limited rotary movement at stated intervals, a notched cam on said shaft designed for continuous rotation and timed driving connections between said cam and said shaft, said connections comprising an arm on said shaft, a pawl pivoted on said arm, said cam being adapted to be engaged at times by said pawl, a member mounted and adapted to normally engage said pawl to prevent its engagement with said cam, an arm arranged for oscillation, a projection on said cam adapted to engage and oscillate said last mentioned arm, means for imparting step-by-step movement to said member in one direction by oscillation of said last mentioned arm, said member being formed with means to coact with said pawl at one position of the movement of the member, thereby permitting the pawl to move into engagement with the notch of said cam and to remain in such engagement until said shaft has performed substantially one revolution whereupon said pawl again engages the portion of said member which throws it out of engagement with said cam and adjustable stop means for regulating the throw of said last mentioned arm.

41. In an automatic popping machine, a popping kettle, means for periodically heating and emptying said kettle, a receptacle receiving batches of corn after the same have been emptied from said kettle and means responsive to low and high level of the popped corn in the receptacle to respectively initiate and terminate operation of said first mentioned means, said last means including an element to rest on the mass of the popped corn and means for periodically raising said element through said popped corn to a position above the top thereof and then returning it to rest on the top thereof.

42. In an automatic popping machine, a popping kettle, means for periodically heating and emptying said kettle, a receptacle receiving batches of corn after the same have been emptied from said kettle and means responsive to low and high level of the popped corn in the receptacle to respectively initiate and terminate operation of said first mentioned means, said last means including an element to rest on the mass of the popped corn and a periodically movable member having a clutch-like engagement with said element to raise it through the popped corn to a position above the top thereof, said clutch-like engagement being then released to permit return of said element to a position resting on top of the popped corn.

43. In an automatic popping machine, a popping kettle, means for periodically heating and emptying said kettle, a receptacle receiving batches of corn after the same have been emptied from said kettle and means responsive to low level of the popped corn in the receptacle to initiate operation of said first mentioned means.

44. In an automatic popping machine, a popping kettle, means for periodically heating and emptying said kettle, a receptacle receiving batches of corn after the same have been emptied from said kettle and means responsive to high level of the popped corn in the receptacle to terminate operation of said first mentioned means.

45. A machine of the character set forth comprising a popping kettle, an electrically controlled heating element therefor, a shaft, means for rotating said shaft, a control switch for said electrically controlled heating element, means operated by said shaft for periodically discharging popped corn from said kettle, means to open said control switch after predetermined operation of said machine and to terminate operation of said means for rotating said shaft, and safety controlling means operable independent of said terminating means to maintain the means for rotating said shaft in operation after movement of said operation terminating means to terminating position and until such time as the popping operation then in process has been completed, said safety controlling means thereafter being moved to inoperative position by said shaft.

46. A machine of the character set forth comprising a popping kettle, an electrically controlled heating element therefor, a shaft, means for rotating said shaft, a control switch for said electrically controlled heating element, means operated by said shaft for periodically discharging popped corn from said kettle, means to open said control switch after predetermined operation of said machine and to terminate operation of said means for rotating said shaft, safety controlling means operable independent of said terminating means to maintain the means for rotating said shaft in operation after movement of said operation terminating means to terminating position and until such time as the popping operation then in process has been completed, said safety controlling means thereafter being moved to inoperative position by said shaft, and heating means for the popped corn, said heating means being rendered operative only when said control switch is open, whereby heat is supplied to the popped corn when the popping operation is discontinued.

ROBERT D. PARKS.
GLENN HILDENBRAND.